United States Patent
Gafri et al.

(10) Patent No.: US 8,393,525 B2
(45) Date of Patent: Mar. 12, 2013

(54) METHOD FOR HIGH PRESSURE/HIGH VELOCITY WELDING OR JOINING FIRST AND SECOND METAL WORKPIECES BEFORE WELDING/JOINING; ARTICLE OF MANUFACTURE MADE THEREBY

(75) Inventors: Oren Gafri, Rishon Le-Zion (IL); Yuri Livshiz, Rishon Le-Zion (IL)

(73) Assignee: Infinity IP Commericalization (Israel) Ltd., Tel Aviv (IL)

( * ) Notice: Subject to any disclaimer, the term of this patent is extended or adjusted under 35 U.S.C. 154(b) by 1114 days.

(21) Appl. No.: 12/308,649

(22) PCT Filed: Jun. 20, 2007

(86) PCT No.: PCT/IL2007/000750
§ 371 (c)(1),
(2), (4) Date: Dec. 19, 2008

(87) PCT Pub. No.: WO2007/148339
PCT Pub. Date: Dec. 27, 2007

(65) Prior Publication Data
US 2010/0108666 A1     May 6, 2010

Related U.S. Application Data

(60) Provisional application No. 60/814,885, filed on Jun. 20, 2006.

(51) Int. Cl.
*B23K 20/00* (2006.01)
(52) U.S. Cl. .................. 228/115; 228/234.1; 228/235.1
(58) Field of Classification Search .................. None
See application file for complete search history.

(56) References Cited

U.S. PATENT DOCUMENTS

| | | | |
|---|---|---|---|
| 5,442,846 A | 8/1995 | Snaper | |
| 5,824,998 A | 10/1998 | Livshiz et al. | |
| 5,981,921 A | 11/1999 | Yablochnikov | |
| 6,207,294 B1 | 3/2001 | Rutter | |
| 2003/0192879 A1* | 10/2003 | Yablochnikov | 219/617 |
| 2007/0218300 A1* | 9/2007 | Helmick et al. | 428/457 |
| 2010/0108666 A1* | 5/2010 | Gafri et al. | 219/603 |

FOREIGN PATENT DOCUMENTS

| | | |
|---|---|---|
| EP | 1 329 279 A1 | 7/2003 |
| GB | 1030604 A | 5/1966 |
| GB | 2 182 276 A | 5/1987 |
| JP | 60-3989 A | 1/1985 |
| JP | 62-84885 A | 4/1987 |
| JP | 2000-202640 A | 7/2000 |

(Continued)

*Primary Examiner* — Kiley Stoner
(74) *Attorney, Agent, or Firm* — Nath, Goldberg & Meyer; Jerald L. Meyer (57) ABSTRACT

A method is provided for forming a metallurgical bond. A first metal workpiece (10) and one or more second metal workpieces (15) are brought into proximity to one another such that a first portion (12) of the first workpiece (10) is in general overlying relationship with a second portion (17) of the one or more second workpieces (15). A suitable material (99) is provided between said first portion (12) and said second portion (17), said material (99) being in the form of particles or foil. At least a first part of said first workpiece (10) comprising said first portion (12) is forced toward said a part of the one or more second workpiece (15) comprising said second portion (17) by means of any one of a suitable high pressure joining process (95) and a high speed joining process, such as to cause the said first metal workpiece (10) and said one or more second metal workpieces (15) to become joined or welded to one another to form a metallurgical bond therebetween.

26 Claims, 8 Drawing Sheets

FOREIGN PATENT DOCUMENTS

| | | | |
|---|---|---|---|
| JP | 2001-300762 A | * | 10/2001 |
| JP | 2003-126986 A | * | 5/2003 |
| WO | WO 97/00595 A1 | | 1/1997 |
| WO | WO 2005/002777 A1 | | 1/2005 |

* cited by examiner

METHOD FOR HIGH PRESSURE/HIGH VELOCITY WELDING OR JOINING FIRST AND SECOND METAL WORKPIECES BEFORE WELDING/JOINING; ARTICLE OF MANUFACTURE MADE THEREBY

FIELD OF THE INVENTION

This invention relates to welding and joining processes based on application of pressure and/or velocity applied to the welding or joining of workpieces.

BACKGROUND OF THE INVENTION

There are a variety of joining or welding processes used for joining/welding workpieces such as to form an interlocking or metallurgical bond between the pieces.

One class of such processes provides a solid state metallurgical bond, i.e., without heating the workpieces to the melting point thereof or adding a brazing filler metal, and includes at least the following well-known processes:
  (i) Pulse Magnetic Forming (PMF).
  (ii) Explosive Welding (EW).
  (iii) Friction Welding (FW).
  (iv) Ultrasonic Welding (USW).
  (v) Diffusion Welding (DFW).
  (vi) Cold Welding (CW).
  (vii) Pressure Gas Welding (PGW).
  (viii) Forge Welding (FOW).

Pulsed magnetic forming (PMF) is a process in which a metal workpiece or a portion thereof is put into a rapid motion by a pulsed magnetic field which causes the workpiece to deform. One advantage of the PMF process is in that the specific heat in this process is minimal and consequently there is no or very little heating of the workpiece, and the process is referred to herein as "cold welding" or welding". In addition, this process does not have the disadvantage of leaving tool marks, as is the case in a variety of other techniques.

The PMF process uses a capacitor bank, a forming coil and often a field shaper for creating an intense magnetic field. The very intense magnetic field required for the PMF process is created, by very rapid discharge of electric energy, stored in the bank capacitor, into the forming coil. The resulting eddy currents that are induced in the workpiece yield magnetic repulsion between the workpiece and the forming coil, and since the forming coil is firmly supported in its position, the repulsion causes the workpiece to deform.

As the workpiece surface moves under the influence of the repulsion force, it absorbs energy from the magnetic field. In order to apply most of the available energy to forming and reduce energy losses due to permeation of energy into the workpiece material (which cause energy waste by resistance heating), the forming magnetic pulse is made to be very short. In most PMF applications, the pulses have a duration between about 10 to about 250 μsec (duration of the first wave of the discharging current).

U.S. Pat. No. 5,824,998 assigned to the present assignee discloses a method of joining or welding of at least a portion of a first metal workpiece to at least a portion of one or more second metal workpieces, comprising inducing movement in said portion of the first workpiece by means of a pulsed magnetic force so as to impact said portion of the second workpiece, the movement imparting a kinetic energy on the at least portion of the first workpiece to cause the two at least portions to join or weld to one another.

U.S. Pat. No. 5,442,846 discloses joining of two adjacent segments of steel pipe having an outer diameter of at least 12 inches, by a bridging sleeve, the sleeve being shrunk to both pipe segments by magnetic forming by means of a short contraction pulse.

Explosive Welding (EW) is a solid state welding process whereby a weld is created between two workpieces by means of a high velocity impact of the workpieces as a result of a controlled detonation. The two workpieces are arranged such that there is a space therebetween, and an explosive charge impacts the two workpieces together at one end forming contact thereat, and the point of contact moves at a rapid velocity across the workpieces as a result of the force created by the detonation until they are fully welded.

Friction Welding (FW) is a solid state process whereby a first workpiece is made to rotate and/or translate with respect to a second workpiece while in contact therewith, the friction created generated between the two providing the energy for the bond Ultrasonic Welding (USW) is a solid state welding process wherein a first workpiece is pressed against a second workpiece at high pressure, and a high frequency vibration is induced at the contact area therebetween providing the energy for the bond.

Diffusion Welding (DFW) is a solid state welding process wherein a first workpiece is pressed against a second workpiece at high pressure and at elevated temperatures, though less than the melting temperature of the workpieces, without substantial deformation or relative motion of the workpieces at the macroscopic scale.

Cold Welding (CW) is a solid state welding process wherein a first workpiece is pressed against a second workpiece at high pressure and at room temperature, with substantial deformation of the workpieces at the weld.

Pressure Gas Welding (PGW) or Hot Pressure Gas Welding is a solid state welding process wherein a first workpiece is pressed against a second workpiece at high pressure and at elevated temperatures, with substantial deformation of the workpieces at the macroscopic scale.

Forge Welding (FOW) or impact welding is a solid state welding process wherein a first workpiece is subjected to high impact blows against a second workpiece while the workpieces are heated to a welding temperature, with substantial deformation of the workpieces at the contact surfaces.

SUMMARY OF THE INVENTION

Herein, with the aim of facilitating better understanding of the invention, use will at times be made with the following terms:

First workpiece—a metal object which has at least a portion which is put into rapid motion by a suitable force, for example a pulse magnetic force, and consequently it joins or welds with the second workpiece (see below).

Second workpiece—a metal object to which at least portion of the first workpiece joins or welds.

Working—a process which is a result of work applied on the surface of the first workpiece or on a portion thereof. Working, in accordance with the invention, in addition to causing a change in shape of the first workpiece, brings to joining or welding of the first workpiece or portion to the second workpiece or to a portion thereof.

Joining—working of a workpiece so as to cause it to come into very tight contact with the second workpiece. Joining, for example, may be an act of constriction of an essentially tubular workpiece against a metallic cylindrical object within the workpiece's interior so as to very strongly and essentially permanently force opposite surfaces of the two objects against one another. The purpose of joining may, for example, be to ensure tight electrical connection, i.e. with minimal electrical resistance, between the two objects.

Welding—forming of the first workpiece in a manner that the two opposite surfaces of the first and the second workpieces become integrated with one another. In welding these two surfaces are in fact melted or fused one into the other, and then solidify together to become integral.

Metallurgical bond—the principal bond that holds metals together arising from increased spatial extension of the valence electron wave functions when an aggregate of the metal atoms is brought close together.

Solid state bond—a bond created by means of a welding process that produces coalescence between two workpieces at temperatures essentially below the melting point of at least one of the workpieces without the addition of a brazing filler metal.

Some embodiments of the invention are defined in the following numbered paragraphs:

1. A method for forming a metallurgical bond between a first metal workpiece and one or more second metal workpieces, comprising:
   (a) bringing said first metal workpiece and said one or more second metal workpieces into proximity to one another such that a first portion of said first workpiece is in general overlying relationship with a second portion of said one or more second workpieces;
   (b) providing suitable material between said first portion and said second portion, said material being in the form of particles or foil; and
   (c) forcing at least a first part of said first workpiece comprising said first portion toward said a part of said one or more second workpiece comprising said second portion by means of any one of a suitable high pressure joining process and a high speed joining process, such as to cause the said first metal workpiece and said one or more second metal workpieces to become joined or welded to one another to form a metallurgical bond therebetween.

2. Method according to embodiment 1, wherein said any one of a suitable high pressure joining process and a high speed joining process comprises forcing said first portion and said second portion into a metallurgical bond-forming mutual contact in a manner such as to induce a contact front between said first portion and said second portion with said material therebetween, said contact front defining a locus between at least one metallurgically-bonded portion, wherein facing parts of said first portion and said second portion have been joined by said process, and at least one unbonded portion, wherein facing parts of said first portion and said second portion are to be joined by said process, wherein said contact front rapidly propagates between said first portion and said second portion.

3. Method according to embodiment 2, wherein at said contact front, said first portion and said second portion meet at said contact front at a predetermined acute angle.

4. Method according to any one of embodiments 2 or 3, wherein said contact front propagates at a velocity above $3*10^3$ m/second.

5. Method according to any one of embodiments 2 to 4, wherein said contact front propagates at a velocity above about 600 m/second.

6. A method according to any one of embodiments 2 to 5, wherein said contact front propagates at a velocity sufficient to form a plasma between said facing parts of said first portion and said second portion in said unbonded portion.

7. A method according to embodiment 6, wherein said plasma comprises at least portions of said material that are heated to plasma form by virtue of said propagating contact front.

8. Method according to any one of embodiments 2 to 7, wherein said process is a magnetic pulse forming (PMF) process.

9. Method according to embodiment 8, wherein in step (c) said PMF process comprises inducing a pulse magnetic force by passing an electric current pulse through a coil, the force being such as to cause said first part to impact onto said second part with an initial kinetic energy of the first workpiece prior to impact which is equal to or larger than the combined plastic deformation energy of the first workpiece and the elastic deformation energy of the second workpiece after impact, whereby said one or more second metal workpieces to become joined or welded to one another.

10. Method according to any one of embodiments 2 to 7, wherein said process is an explosive welding process.

11. Method according to any one of embodiments 2 to 7, wherein said process is a friction welding.

12. Method according to any one of embodiments 2 to 7, wherein said process is an ultrasonic welding process.

13. Method according to any one of embodiments 2 to 7, wherein said process is a diffusion welding process.

14. Method according to any one of embodiments 2 to 7, wherein said process is a cold welding process.

15. Method according to any one of embodiments 2 to 7, wherein said process is a pressure gas welding process.

16. Method according to any one of embodiments 2 to 7, wherein said process is a forge welding process.

17. Method according to any one of embodiments 1 to 16, wherein in step (b) said particles are applied to at least one of said first portion and said second portion.

18. Method according to embodiment 17, wherein step (b) is performed prior to step (a).

19. Method according to any one of embodiments 1 to 18, wherein said particles are applied to at least one of a first surface of said first portion and a second surface of said second portion.

20. Method according to embodiment 19, wherein said particles are applied to at least one of a first surface and said second surface by spraying or coating said to at least one of a first surface said second surface with an emulsion comprising said metallic powder.

21. Method according to embodiment 20, wherein said emulsion comprises particles suspended in a suitable gas or liquid.

22. Method according to embodiment 19, wherein said particles are applied to at least one of a first surface said second surface by inducing static electrical attraction forces between at least one of a first surface said second surface and said particles.

23. Method according to embodiment 19, wherein said particles are metallic and magnetized, and at least one of said first portion and said second portion is magnetisable and suitable current is passed therethrough to magnetise the same in proximity to said metallic powder, causing the powder to be magnetically attracted to at least one of said first portion and said second portion.

24. Method according to any one of embodiments 1 to 23, wherein at least one of said first portion and said second portion comprises surface features configured for retaining said particles at least prior to step (c).

25. Method according to embodiment 24, wherein said surface features includes any one of depressions, dimples, channels and the like.

26. Method according to any one of embodiments 1 to 25, wherein at least some of said particles are made from a metal in common with that of at least one of said first portion and said second portion.

27. Method according to any one of embodiments 1 to 26, wherein at least some of said particles are made from a metal in common with that of said first portion and said second portion.

28. Method according to any one of embodiments 1 to 27, wherein said particles comprise one or more metals which are different from one or more metals constituting said first portion and said second portion.

29. Method according to any one of embodiments 1 to 28, wherein said particles have an effective diameter or characteristic dimension in the range of about $1*10^{-6}$ meters and about $200*10^{-6}$ meters.

30. Method according to any one of embodiments 1 to 28, wherein said particles have an effective diameter or characteristic dimension in the range of about $5*10^{-6}$ meters and about $50*10^{-6}$ meters.

31. Method according to any one of embodiments 1 to 28, wherein said particles have an effective diameter or characteristic dimension in the order of about $10^{-9}$ meters.

32. Method according to any one of embodiments 1 to 31, wherein said particles comprise at least one metal or alloy chosen from: aluminium, iron or steel, copper, magnesium, bismuth, lithium, nickel, zinc, magnesium, silver, gold, titanium, tin.

33. Method according to any one of embodiments 1 to 32, wherein said particles comprise at least one ceramic chosen from: magnesium oxide, aluminium oxide.

34. Method according to any one of embodiments 1 to 28, wherein said foil comprises a metallic foil of thickness between about $1*10^{-6}$ m to about $200*10^{-6}$ m.

35. Method according to any one of embodiments 1 to 28, wherein said foil comprises a metallic foil of thickness between about $5*10^{-6}$ m to about $50*10^{-6}$ m.

36. An article of manufacture comprising a first metal workpiece welded to one or more second metal workpieces according to the method of any one of embodiments 1 to 35.

In the high pressure/high velocity joining or welding according to some aspects of the invention, a gap is provided between the first workpiece and the second workpiece prior to implementation of the process. The process then forces the first portion and said second portion into a metallurgical bond-forming mutual contact in a manner such as to induce a contact front between the first portion and the second portion with said material therebetween, and thus the as-yet unbonded contact surfaces of the workpieces form an angle, say α, therebetween.

The contact front defines a moving locus or separation line between at least one metallurgically-bonded portion, wherein facing parts of the first portion and said second portion have been joined by said process, and at least one unbonded portion, wherein facing parts of the first portion and the second portion are to be joined by said process. The contact front rapidly propagates between said first portion and said second portion until the whole of the first portion is bonded to the second portion.

The speed of propagation of the contact point, Vc.p., may be related to the impact speed Vr between the two workpieces by the relationship:

$$Vc.p.=Vr/\text{tangent (angle }\alpha) \qquad (1)$$

The impact speed may be given by the relationship.

$$Vr=[2*p*h/(\gamma*\Delta)]^{\wedge}0.5 \qquad (2)$$

where:
h—is gap between workpieces
l—is a length workpieces that is to be welded together
p—is a high pulsed pressure (i.e. magnetic pressure)
γ—is the specific density of the material
Δ—is the thickness of the workpiece that is being deformed by the pressure induced force.

Combining (1) and (2) together, the following relationship may be provided for Vc.p.

$$Vc.p.=1*[2*p/(\Delta*\gamma*h)]^{\wedge}0.5 \qquad (3)$$

Relationship (3) provides an indication of how the different parameters therein may be changed if Vc.p can be reduced.

For example a smaller gap may be used for the same pressure, or less pressure may be needed for the same gap and length.

Providing particles or a foil according to the invention enables Vc.p. to be reduced, and thus permits lower pressures and/or smaller gaps to be used than would be the case without using the particles or foil. Similarly, longer weld lengths may be provided for the same gap and/or pressure.

The above relationships also apply, mutatis mutandis, to other solid state welding processes used in the present invention in which a force is provided to create a propagating weld front or contact point between the two workpieces, mutates mutandis According to some embodiments of the invention, the dimension of the gap and/or the magnitude of the induced force for any given combination of first workpiece and second workpiece can be reduced by adding said material between the two workpieces prior to inducing this force.

Without being restricted to theory, a plasma is normally created between two workpieces when the force is applied. As the contact front propagates, the plasma—formed as a result of the high temperatures and pressures suddenly applied to the air or gas between workpieces as the air or gas tries to rapidly evacuate this space—essentially cleans the mutually facing and/or faying surfaces of the workpieces and energises the same, enabling a metallurgical bond to join the two together downstream of the contact front. The addition of powder between the workpieces enables the plasma to be formed more easily, thereby reducing the gap size and/or the required magnitude for the applied force.

Thus, the particles may serve to increase the heat of the plasma wave between the surfaces that are being welded together, increasing the local temperature thereat and enhancing the weld produced.

According to other aspects of the invention, the two workpieces are brought into abutting contact, having already provided particles or foil according to the invention therebetween, and then a continuous high pressure or impact pressure is applied, and the presence of the particles and/or the foil also enhances the welding process.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EMBODIMENTS

Figure 1:
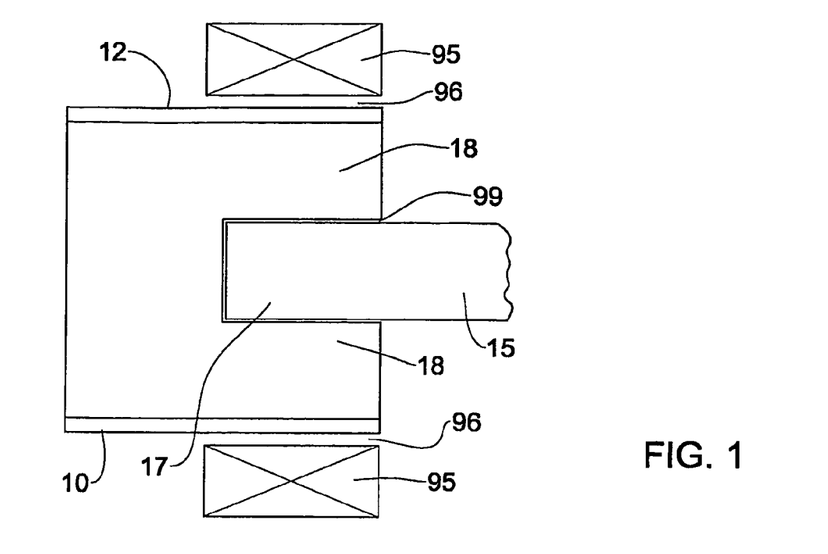
FIG. 1 schematically illustrates welding together concentric workpieces according to one aspect of the invention.

Referring to FIG. 1, a manner of joining two workpieces according to the invention is illustrated. In this example, the first workpiece is in the form of a cylindrical element 10 having at least a first portion 12 thereof in concentric and overlying relationship with a second portion 17 of a second workpiece, which is in the form of a bar 15. A small gap 18 separates the first portion from the second portion prior to being subjected to a suitable joining or welding force using any suitable technique for so doing. In the illustrated embodiment, this joining force is a pulse magnetic force.

U.S. Pat. No. 5,824,998, assigned to the present Assignee, and the contents of which are incorporated herein in their entirety, disclose an apparatus and method for joining or welding two workpieces using a pulse magnetic force. While such a method and apparatus as disclosed in the aforementioned patent may be utilized for providing the required PMF force, as will be described further herein, the present invention is not limited thereto, and may employ any suitable PMF technique.

According to the invention, a quantity of suitable particles 99 is provided in this gap 18 prior to the first portion and second portion being forced together by means of the PMF force.

According to the invention, the particles 99 may include particles of any suitable shape and size. Typically, the particles are generally spherically shaped, but may have instead any other regular or irregular shape, for example some particles may have the form of strands or the like, and the shape of the particles may vary from particle to particle.

The size of the particles 99 may also be generally uniform or may also vary from particle to particle. Particle size may be expressed in terms of a unique dimension where the shape thereof is known. For example, for generally spherical particles, size may be expressed as a diameter. Particularly for irregularly shaped particles, particle size may be conveniently expressed in terms of an effective diameter, which can be defined as the diameter of a spherical particle having the same volume as the particle in question. The actual or effective diameter of such particles may range starting from about $1*10^{-6}$ m or about $5*10^{-6}$ m to about $50*10^{-6}$ m or about $200*10^{-6}$ m, for example, or may be even smaller than $1*10^{-6}$ m, in some cases being in the order of $10^{-9}$ m.

Smaller particles may in general be better than larger particles, as the smaller particles have greater surface energy, and thus less energy is required for plasma creation. However, optimal sizes for the particles may be a function of the combustibility of the particle material. For example, with magnesium, aluminium or nickel, relatively large particles may be used to provide the same effect as may be obtained using relatively smaller particles of steel.

The particles 99 may be made from any suitable metal or ceramic, and in accordance with one aspect of the invention the particles are non-adhesive, i.e., do not comprise an adhesive material. The particles 99 used in the joining or welding of two workpieces may all comprise the same metal or other material, or may include a mixture of different metals or ceramic or other suitable particles, for example some particles being made from one metal, while other particles being made from a different metal, ceramic, plastic, or other material. At least some of the optionally metallic particles 99 may be made of the same metal as one or the other or both of the first workpiece 10 and the second workpiece 15, or at least of the same metal as one or the other or both of the first portion 12 and second portion 17.

For example, the particles 99 may be made from any one of or alloys of: aluminium, zinc, magnesium, iron or steel, copper, magnesium, bismuth, lithium, nickel, silver, gold, titanium, tin; or from ceramics or metal oxides, such as for example aluminium oxide or magnesium oxide, or from plastics, or indeed any suitable material, in particular materials that may form a plasma.

According to the embodiment illustrated in FIG. 1, the particles 99 are conveniently applied to the second portion 17 only. The particles 99 may be applied in a number of different ways. For example, in the embodiment illustrated in FIG. 1, the second portion 17 of the rod 15 may be dipped into a vessel containing a quantity of said particles, which may have the appearance of metallic powder for example, and some particles may adhere to the surface of the second portion 17.

Alternatively, the particles 99 may be suspended in a fluid medium to form an emulsion. The fluid medium may be a gas or liquid, for example an alcohol or ether, and the emulsion sprayed or coated onto the surface of the second portion 17. For example, the particles may comprise a silver based powder mixed in acetone, the acetone evaporating off when the emulsion is applied to the part of the workpiece.

The particles may be passed through a suitable dosimeter to provide the required consistency or concentration of particles. Optionally, an electrical potential may be induced on the rod 17, while the particles are also charged with the opposite electrical potential, facilitating adherence of the particles 99 to the surface of the second part 17. This electrical attraction technique may also be used for applying metallic particles 99 directly to the second portion 17, without the use of an emulsion, mutatis mutandis.

Alternatively, when made from a suitable metal, the particles 99 may be magnetized, and by suitably magnetizing, permanently or temporarily, the rod 15, when this is also made from a magnetizable metal, the magnetized particles may be attracted and retained on the surface of the second portion 17 until the PMF process is applied.

Preferably, a thin layer of particles 99 is applied, being generally uniformly distributed over the second portion 17. The particles may be formed as a layer of particles covering the full surface of the second portion 17, either uniformly or non-uniformly, and may be on average one particle thick, or may comprise an average thickness greater than that of a particle, for example two, three, four, five or more times the thickness of the particles. Alternatively, the particles may be scattered in pockets or islands of particles, separated by regions in which there are no particles, or in the form of a net, surrounding a plurality of adjacent regions in which there are no particles.

Nonetheless, according to the invention, the metallic particles 99 may instead be applied to the first portion 12 only, or to both the first portion 12 and second portion 17, in similar manner to that described above for the second portion 17, mutatis mutandis.

Once the particles 99 have been applied to the second portion 17, the PMF process can be applied to the two workpieces 10, 15.

A suitable PMF force may be applied by placing the two workpieces, 10, 15, suitably coaxially aligned, in the lumen 96 of a suitable PMF coil 95, for example in a manner similar to that described in U.S. Pat. No. 5,824,998, the contents of which are incorporated herein in their entirety. After application of the PMF force, the first part 18 is forced against the second part 17, sandwiching the layer of metallic particles 99 therebetween. Without being bound by theory, it is believed that when the PMF force is large enough such as to enable the two workpieces to be welded or crimped together, the metallic particles 99 facilitate to welding and fusion of the two facing surfaces of the first part 18 and the second part 17. Typically, the width of coil 96 determines the length of a workpiece which will be worked when current is discharged through coil 96.

In may be appreciated that in the embodiment illustrated in FIG. 1, the rod 15 may be replaced by a tube, and that in this manner two tubes of any desired length may be welded together over any desired length in a similar manner as described above for the arrangement of FIG. 1, mutatis mutandis.

It may further be appreciated that, according to other aspects of the invention, the joining force is provided by other means instead of the pulse magnetic force, mutatis mutandis, to produce a solid state weld between the two workpieces 10, 15, having provided therebetween the particles 99.

For example, according to another aspect of the invention, the joining force may be provided by means of an explosive welding process, or indeed any of the other process, such as for example: Friction Welding (FW), Ultrasonic Welding (USW), Diffusion Welding (DFW), Cold Welding (CW), Pressure Gas Welding (PGW), Forge Welding (FOW), as appropriate, mutatis mutandis.

Thus, in the corresponding explosive welding process rather than a coil 95, a suitable coil of explosive charge is arranged on the outside of the first portion 12, and detonated in a controlled manner such that the left hand side of the first portion 12, as seen in FIG. 1, is first forced against the second portion 17 to provide a welding contact at a circumferential zone between the two work pieces. As detonation progresses, the contact area progresses between the two work pieces in a direction towards the right of this figure, until a solid state bond is provided between the first portion 12 and the second portion 17.

Reference is now made to FIGS. 2 to 6 which show the manner of joining of a cable to a cable lug in accordance with the invention. Cable lug 22 comprises an attachment base 24 for attachment to another body, and an essentially tubular portion 25 with a lumen 26. Cable 28 comprises a plurality of conductor fibers 30 each having an essentially cylindrical cross-section.

Figure 2:
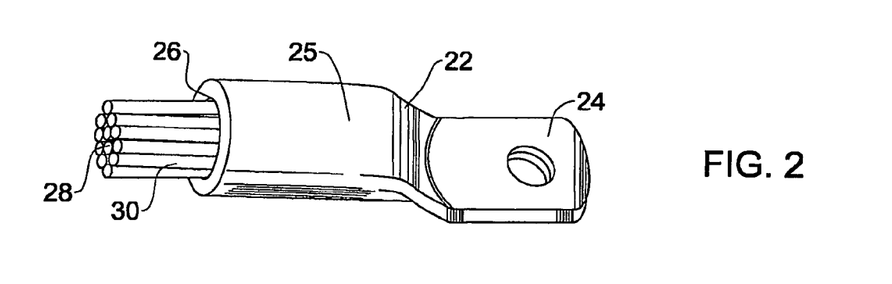
FIG. 2 is a perspective view of an assembly consisting of a cable and a cable lug after insertion of the end of the cable into the lumen of the cable lug.
Figure 3:
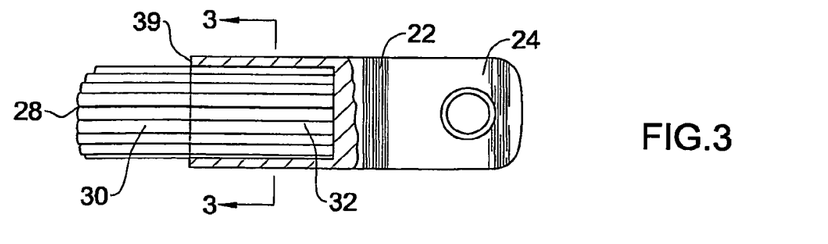
FIG. 3 is an upper, partially cross-sectional view of the assembly of FIG. 2.
Figure 4:
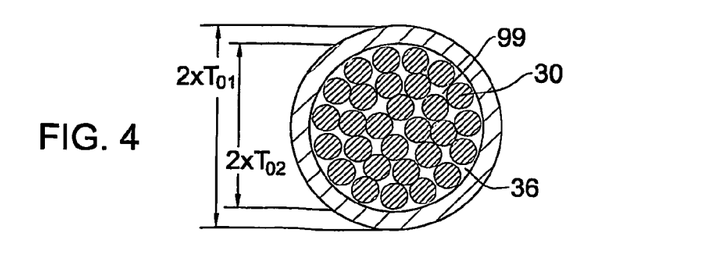
FIG. 4 is a cross-section through lines 3-3 in FIG. 3.

Cable 28 and cable lug 22 are combined by inserting end portion 32 of the cable into lumen 26 of the cable lug as can be seen in FIGS. 2 to 4. The cylindrical portion 25 has an original radius r01 and the cable has an original radius r02.

Figure 5:
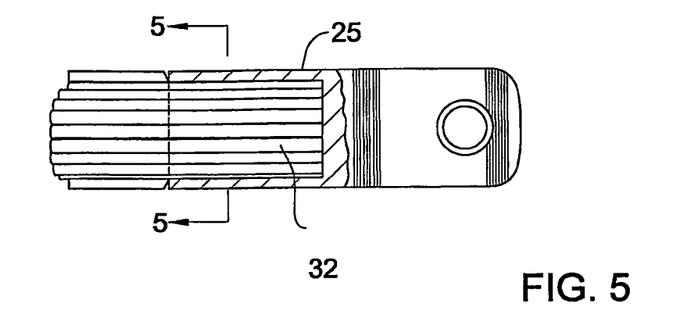
FIG. 5 is an upper, partially cross-sectional view of the assembly after constriction of the cylindrical portion of the cable lug and the formation of a firm joint between the cable and the cable lug.

A suitable coating of particles 99 is then applied to the end portion 32, in a similar manner to that described for the embodiment of FIG. 1, mutatis mutandis. However, the particles may be coated on the external surface of each fiber 30, so that when a suitable force via pulsed magnetic forming process or explosive welding process, or indeed any other suitable high pressure or high velocity welding or joining process according to the invention, is applied onto the cylindrical portion 25, in a similar manner to that described for the embodiment of FIG. 1, mutatis mutandis, the cylindrical portion 25 becomes constricted. The inner faces of cylindrical portion 25 become welded with the end portion 32 of cable 28, and the fibers 30 in the lumen 26 also become welded to one another, this being facilitated by the particles thereat, as can be seen in FIG. 5. Alternatively, the particles may be coated only on the generally outwardly facing portions of the external surfaces of the fiber bundle that face the inner surface of the lumen 26. In this case, when the force is applied, the particles generally facilitate welding between the fibers and lug 22.

In this embodiment, and in other embodiments mutatis mutandis, the fibers may optionally be passed between a pair of counter-rotating brushes, which are partially immersed in a paste or emulsion comprising the particles, thereby brushing particles (in the paste or emulsion) onto the fibers.

Figure 6:
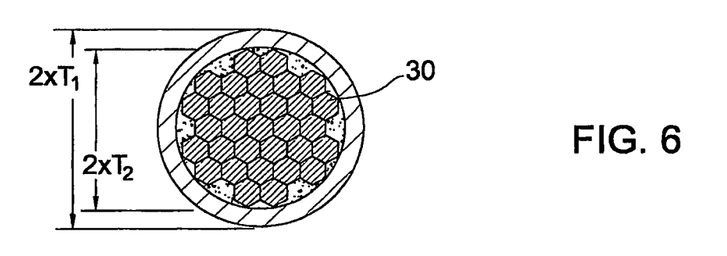
FIG. 6 is a cross-section through lines 5-5 in FIG. 5.

In any case, as a result of this constriction, shown in FIG. 6, fibers 30 are compressed to become hexagonal, and may possibly coalesce into a fused stump, assisted by the presence of the particles which form a metallurgical bond between the fibers 30 themselves, and also between the fibers and the cylindrical portion 25. After constriction the cylindrical portion 25, has a radius r1 and the cable has a radius r2. Following constriction, there is some thickening of the walls of the constricted tubular portion 25.

In a typical cable, fibers may fill up about 65% of its internal space, for example. After full compression, whereby the fibers become hexagonal, the fibers together with the particles can come to fill essentially all of the internal space of the cable.

The inventors have determined that by providing particles between the fibers and/or between the particles and the cylindrical section, a full metallurgical weld, a semi weld, or crimping can be obtained therebetween, depending on the energy level of the force provided to the cylindrical section 25. The better the quality of the join or weld between the fibers and the cylindrical section, the greater the mechanical integrity of the cable/cable lug, and the better the resistance thereof to thermal shock.

Figure 7A:
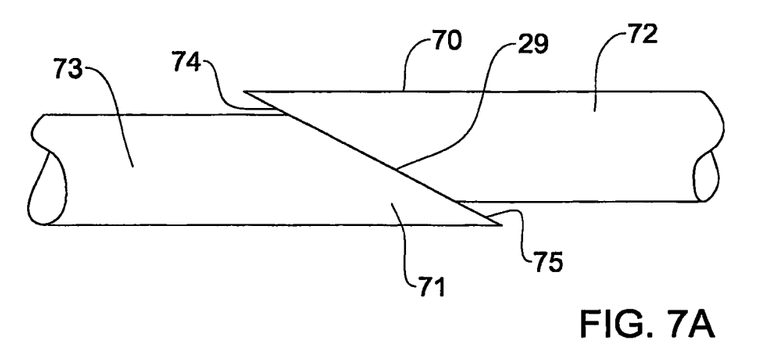
FIGS. 7A and 7B show a schematic representation of the manner of joining of two poles, in accordance with an embodiment of the invention.
Figure 7B:
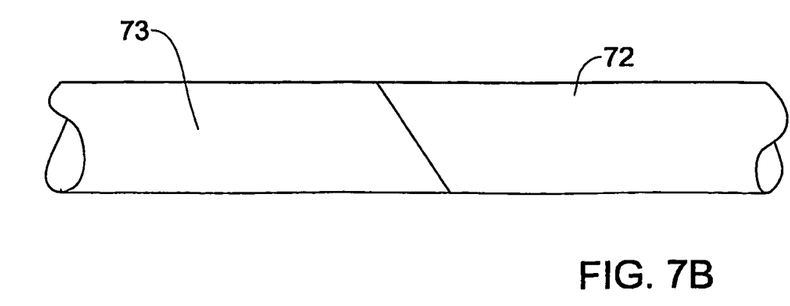

FIGS. 7A and 7B show the manner of joining together of two ends of elongated metal objects in accordance with an embodiment of the invention. The ends 70 and 71 of elongated objects 72 and 73, respectively, is cut or beveled so as to produce two complementary oblique surfaces 74, 75 with a relatively obtuse angle versus the longitudinal axis of the body. Suitable particles 99 are applied to at least one of the two surfaces 74, 75 in a manner similar to that described for the embodiment of FIG. 1, mutatis mutandis, for example. The two objects 72, 73 are placed so that their beveled or cut ends 70, 71, one or both of which comprise the metallic powder, touch one another with their axis being slightly out of line with respect to one another. Then, following the application of a strong pulsed magnetic force or other suitable joining force, as shown schematically by the arrows in FIG. 7A, the two end segments 70 and 71 impact one another and become welded, i.e. integral, with one another.

Figure 8A:
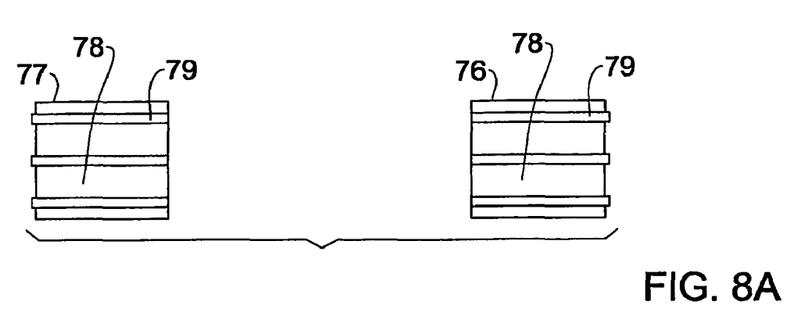
FIGS. 8A, 8B, and 8C show a schematic representation of the manner of joining of two super conductor cables to one another, in accordance with an embodiment of the invention.
Figure 8B:
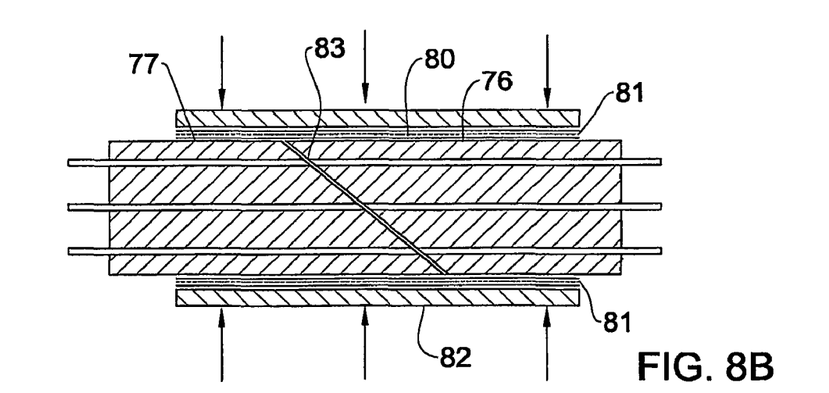
Figure 8C:
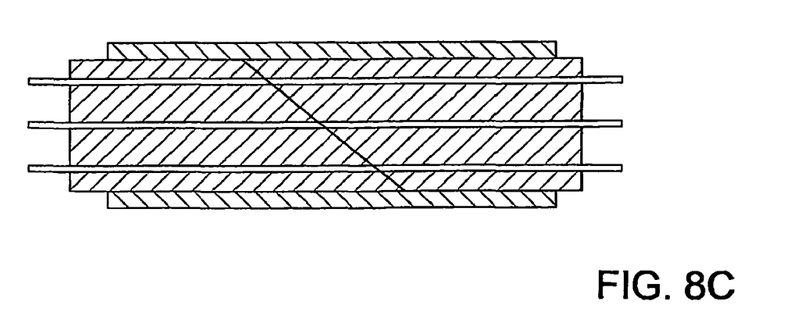

FIGS. 8A-8C show a manner of joining ends of two super conductor cables in accordance with an embodiment of the invention. Two super conductor cables 76 and 77, of which only the end portion is shown, comprise each a metal matrix 78 made from a first metal alloy and filaments 79 made of a second metal alloy. In order to have proper electrical continuity, it is necessary to join two ends so that the filaments will be coextensive. For this purpose, the ends 76 and 77 of the two cables are cut diagonally similarly as in the case of the rods in FIGS. 7A and 7B, but this time, metallic particles 99 are applied to one or both of the slanted surfaces. This may be done in a number of ways. For example, two different metallic particles, made from the first and second alloys, respectively, may be applied selectively on one or both slanted surfaces, so that second alloy metallic particles are applied at the areas of the slanted faces corresponding to the cut ends of the filaments 79, while first alloy metallic particles are applied to the areas of the slanted faces corresponding to the metal matrix.

The ends 76 and 77 are brought into contact with one another within lumen 80 of cylindrical workpiece 82 (FIG. 8B), the inside surface of which was previously coated with particles 99 at 81. Then by the application of a pulsed magnetic force or other suitable joining force, represented schematically by the arrows in FIG. 8B, the cylindrical workpiece 82 is constricted onto the super conductor cable and consequently the tight joint between the two cables is obtained as shown in FIG. 8C.

Figure 9A:
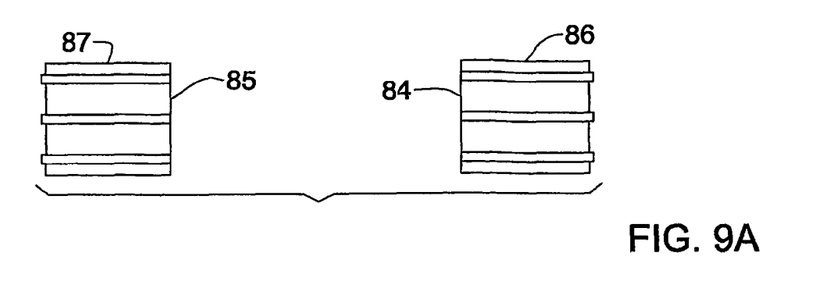
FIGS. 9A, 9B, 9C and 9D show a schematic representation of another embodiment in accordance with the invention for joining of two super conductor cables.
Figure 9B:
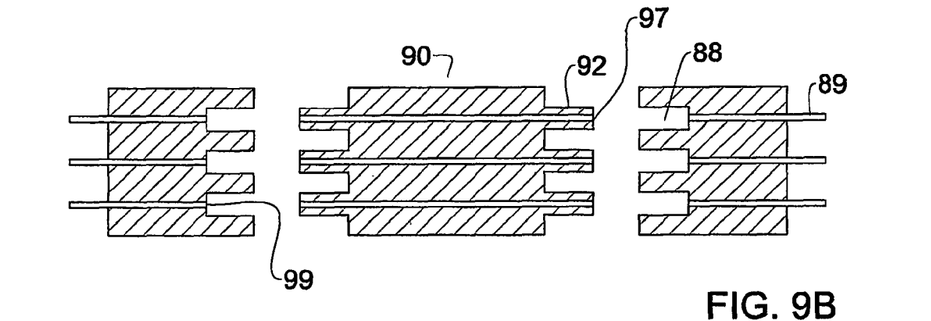
Figure 9C:
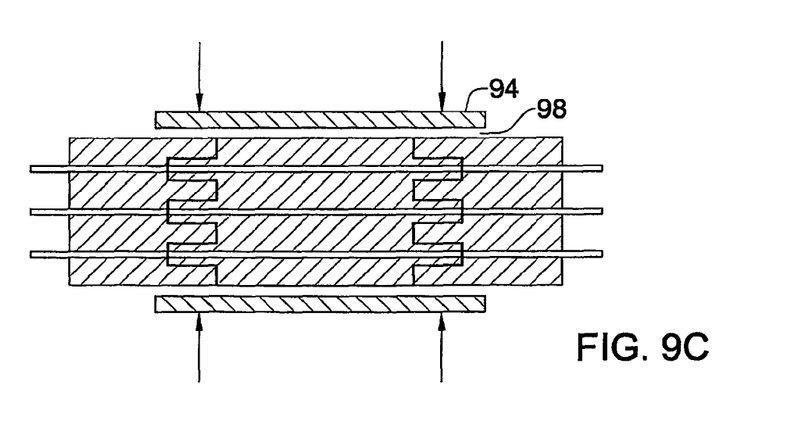
Figure 9D:
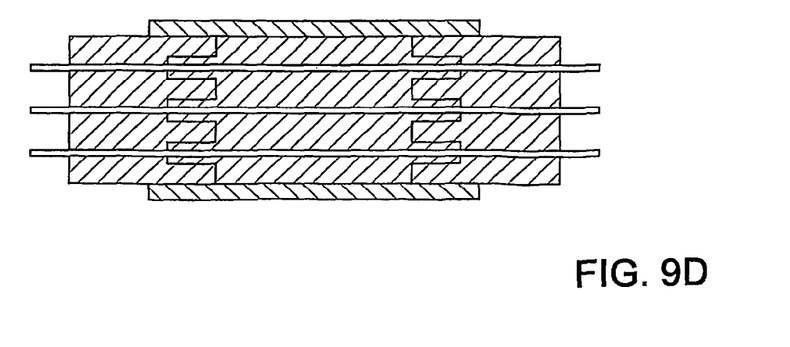

The manner of joining of two super conductor cables in accordance with another embodiment of the invention is shown in FIGS. 9A to 9D. The end faces 84 and 85 of cables 86 and 87 respectively, are bored to obtain a plurality of bores 88, each corresponding to a filament 89 of the super conductor cable, as can be seen in FIG. 9B. A joining member 90 comprising projections 92 which correspond to bores 88, is provided, and optionally, metallic particles 99 may be applied to either one or both or the projections 92 or bores 88, and/or to the corresponding connection surfaces of the matrix surfaces. The joining member 90 is combined with the two ends of the super conductor cables, as shown in FIG. 9C, and then a cylinder 94 is placed over this assembly, a coating of metallic particles 98 having been applied to the inside of cylinder 94 and/or to the outside of the parts of the cables 86, 87 and member 90 to be covered by the cylinder 94. Then a suitable PMF force or other high pressure or high velocity induced force is applied, as shown schematically by the arrows in FIG. 9C, and consequently cylinder 94 is constricted onto the cable and as a result a firm joint is obtained, as shown in FIG. 9D.

Figure 10A:
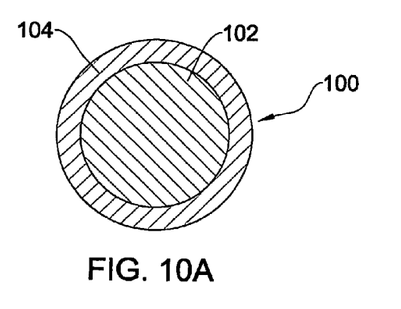
FIGS. 10A, 10B and 10C show a schematic cross-sectional representation of the manner of production of a grounding cable according to an embodiment of the invention.
Figure 10B:
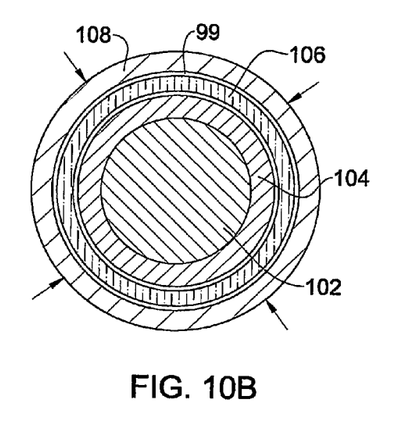
Figure 10C:
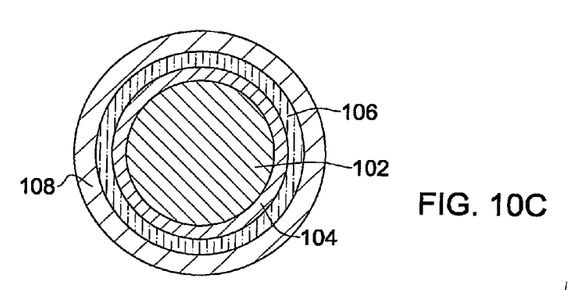

The manner of preparation of a ground cable or lead in accordance with an embodiment of the invention is shown in FIGS. 10A-10C. A conductor 100 shown in FIG. 10A consists of a core 102 made of one alloy, e.g. iron, and a clad 104 made of another alloy, e.g. copper. The conductor 100 may be prepared as explained in relation to FIG. 1, mutatis mutandis. A cylinder or envelope 106 made of insulating material such as polyethylene, a ceramic material, etc. is placed over the conductor, the cylinder or envelope being overlaid by a metal, e.g. a copper cylinder 108, as can be seen in FIG. 10B. Suitable particles 99 according to the invention are applied between the cylinder 108 and envelope 106. Following application of a magnetic force or other suitable force according to the invention, as represented schematically by the arrows in FIG. 10B, the metal cylinder 108 is constricted, which causes also constriction of insulator 106 so as to achieve the tight structure shown in FIG. 10C.

Figures 11A, 11B:
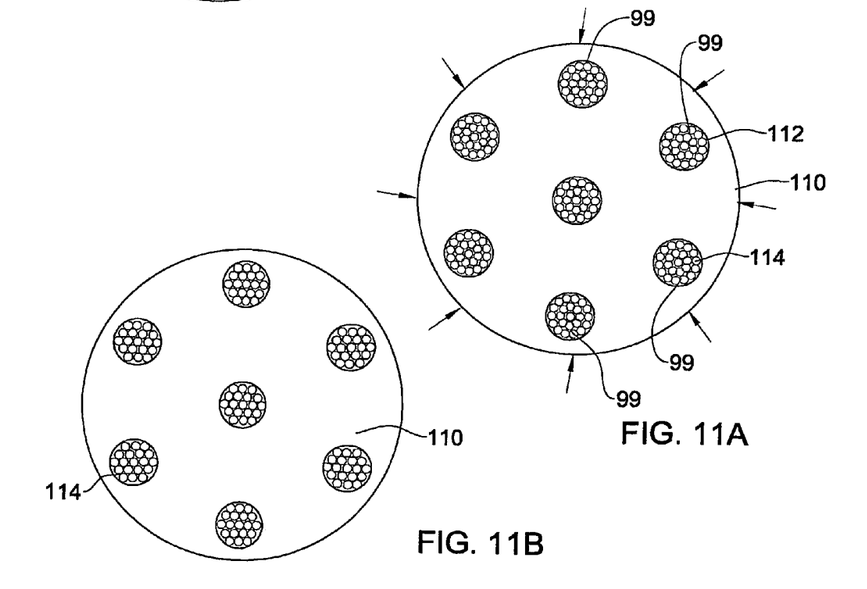
FIGS. 11A and 11B show a schematic cross-sectional representation of the manner of producing a super conductor cable in accordance with the invention.

Reference is now being made to FIGS. 11A-11B showing the schematic representation of the manner of producing a super conductor cable in accordance with an embodiment of the invention. A longitudinal matrix 110 which is made of one alloy, e.g. copper, comprises a plurality of longitudinal bores 112, and filaments 114 made from another alloy are introduced into each of the bores, as shown in FIG. 11A. Either the filments 114 (individually or as a bundle), the inside surface of the bores 112, or both filaments and bores, are coated with a suitable particles 99 in the manner as described above for other embodiments, mutatis mutandis. Following the application of a pulsed magnetic force or other suitable force according to the invention, as represented by the arrows in FIG. 11A, the entire cable is constricted and consequently the walls of each of the bores joins with the filaments, at least partially via the metallic particles to yield a super conductor cable with practically no void space, as can be seen in FIG. 11B.

Figure 12:
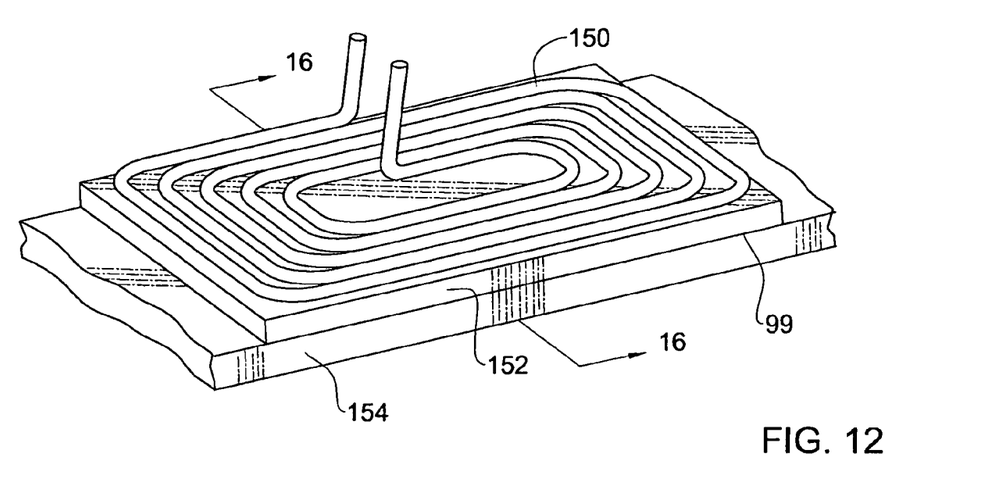
FIG. 12 shows the set-up for welding of two planar metal objects.
Figure 13:
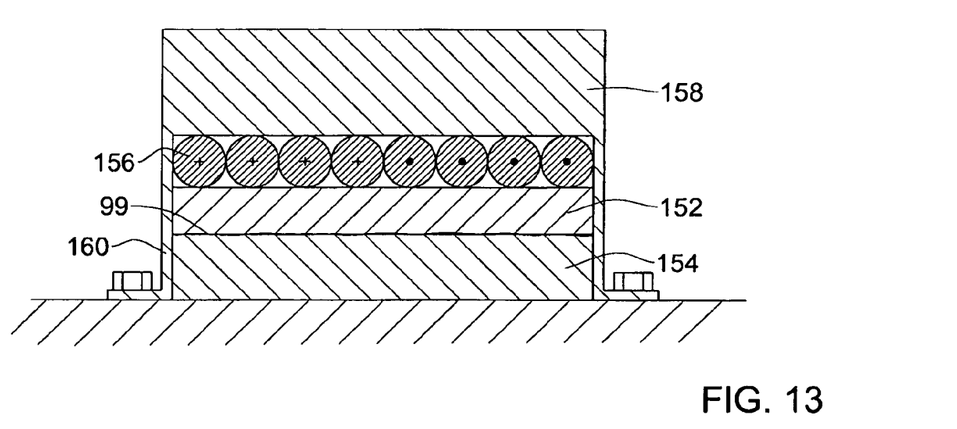
FIG. 13 is a cross-section through lines 16-16 in FIG. 12.

A set-up for welding of two planar metal workpieces is shown in a perspective view in FIG. 12 and in a cross-section in FIG. 13 (in FIG. 12, the support structure of the coil has been removed for the purpose of ease of illustration). In order to join two planar workpieces, an essentially planar coil is used. Planar coil 150 shown in FIG. 12 has an overall shape and size substantially the same as the shape and size of the area of the first workpiece 152 which is to be joined with the second workpiece 154, and particles 99 are applied inbetween the workpieces 152, 154. As can be seen in FIG. 13, the coil windings 156 are held in place by support wall 158 which is anchored onto a working stage by means of anchoring member 160. Upon passing of a pulsed current in coil 150, planar workpiece 152 will move rapidly downwards and if it will impact, workpiece 154 sufficiently rapidly, e.g. at a speed above about 300 m/sec or about 200 m/sec, the two metal workpieces will be welded to one another. For that purpose, a magnetic force is applied from the direction as represented by the arrows in these figures.

Figure 14A:
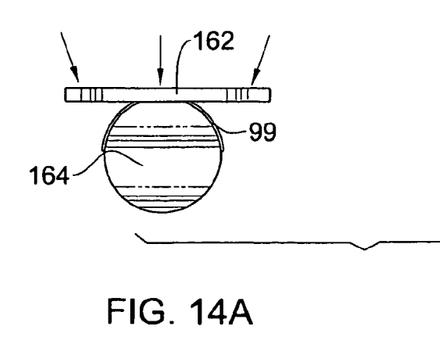
FIGS. 14A and 14B show an embodiment in which an initially planar metal workpiece is PMF welded to a cylindrical metal workpiece.
Figure 14B:
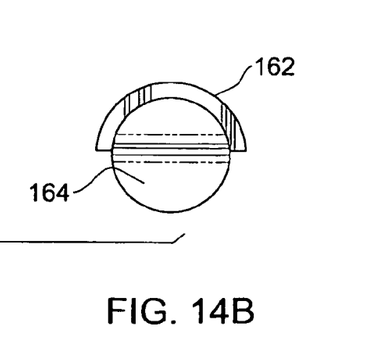
Figure 15A:
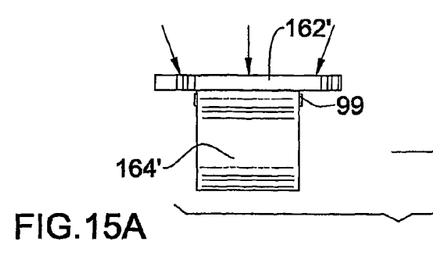
FIGS. 15A and 15B show another embodiment in which an initially planar metal workpiece is PMF welded to a prismatic metal workpiece.
Figure 15B:
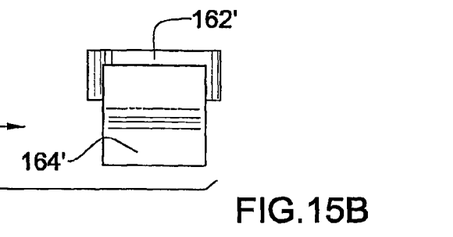

Reference is now being made to FIGS. 14A and 14B showing, schematically, the welding of a planar workpiece 162 onto cylindrical object 164 (shown in cross-section), wherein particles 99, have been applied to one or both facing surfaces of the workpiece 162 and object 164 before application of a suitable PMF force or other suitable joining/welding force according to the invention. Similarly, FIGS. 15A and 15B show the welding of a planar workpiece 162' onto prismatic object 164' of rectangular cross-section, wherein particles 99, have been applied to one or both facing surfaces of the workpiece 162' and object 164' before application of a suitable PMF force or other suitable joining force according to the invention. Similarly, planar workpieces may be welded to spherical or other 3D workpieces, mutatis mutandis.

Figures 16, 17:
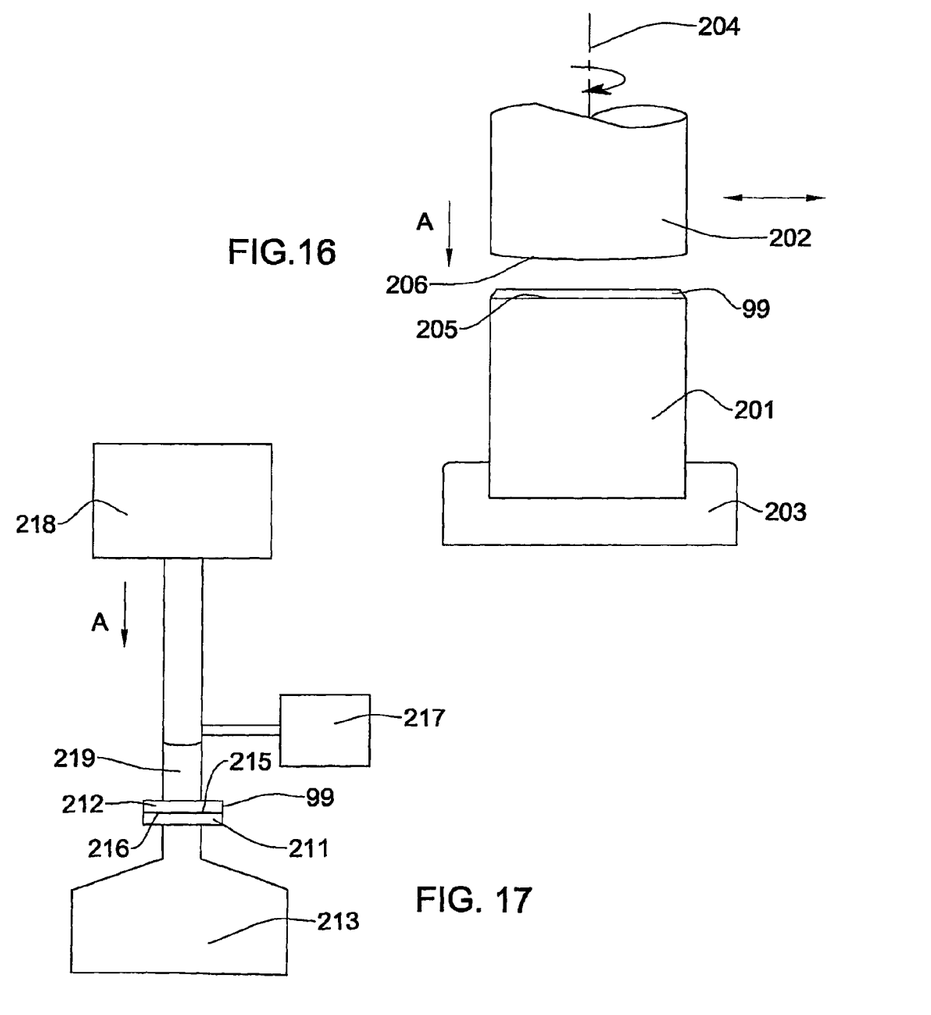
FIG. 16 schematically illustrates welding together workpieces according to another aspect of the invention.
FIG. 17 schematically illustrates welding together workpieces according to yet other aspects of the invention.

Referring to FIG. 16, a welding process according to another aspect of the invention is illustrated, based on friction welding. A first workpiece 201 is held substantially stationary via clamp 203, and a second workpiece 202 is pressed against the first workpiece 201 along arrow A, and rotated about an axis 204 and/or translated so as to generate a high frictional force between the two workpieces at the facing surfaces 205, 206, respectively, thereof. Prior to initiating the friction welding process, a layer of said particles 99 according to the invention may be applied to one or both surfaces 205, 206. Alternatively, the second workpiece may be immovably clamped and the first workpiece rotated and/or translated to create the frictional force between the facing workpiece surfaces including the particles. Alternatively, both the first workpiece and the second workpiece may be rotated and/or translated with respect to one another to create the frictional force between the facing workpiece surfaces including the particles.

Without being bound to theory, the frictional force between the workpieces 201, 202 may cause at least part of the particles 99 to burn or form a plasma, which in turn assists in the solid state welding between the surfaces 205, 206.

Referring to FIG. 17, a welding process according to another aspect of the invention is illustrated, based on ultrasonic welding. A first workpiece 211 is held on anvil 213, and a second workpiece 212 is attached at the sonotrode tip 219 of a reed clamped to a mass 218. The second workpiece 212 is pressed against the first workpiece 211 along arrow A, such that mutually facing surfaces 215, 216 are in contact. An ultrasonic transducer 217, via a suitable wedge, provides high frequency vibration energy to the reed 219, which is transmitted to the workpieces 212, 211. Prior to initiating the ultrasonic welding process, and in fact to bring the workpieces 211, 212 together, a layer of said particles 99 according to the invention may be applied to one or both surfaces 215, 216. Additionally or alternatively, vibration energy may be applied to the first workpiece.

Without being bound to theory, the vibration energy between the workpieces 211, 212 may cause at least part of the particles 99 to burn or form a plasma, which in turn assists in the solid state welding between the surfaces 215, 216.

Figure 18:
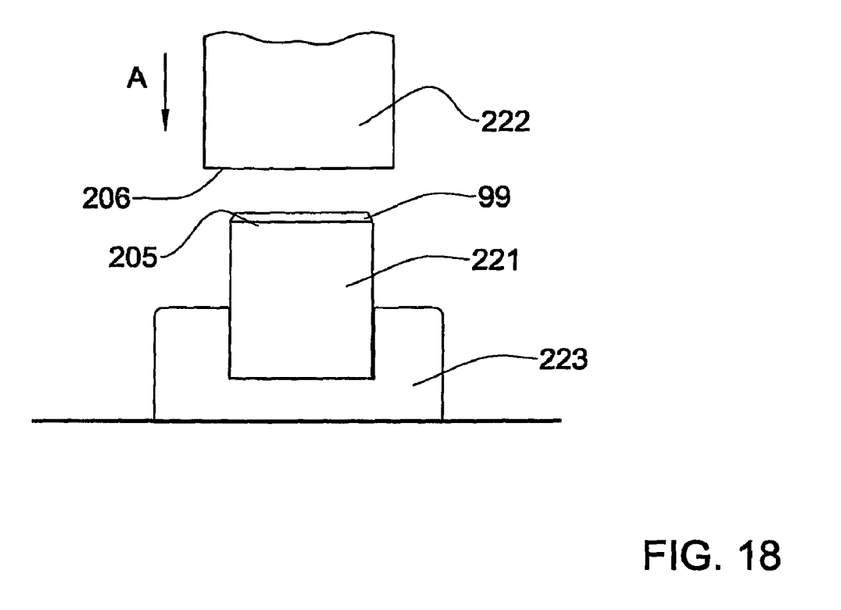
FIG. 18 schematically illustrates welding together workpieces according to yet other aspects of the invention.

Referring to FIG. 18, a welding process according to another aspect of the invention is illustrated, based on diffusion welding or crimping. A first workpiece 221 is held substantially stationary via clamp 223, and a second workpiece 212 is pressed against the first workpiece 211 along arrow A via a suitable press, at a predetermined pressure and temperature such as to provide a diffusion weld or crimp between the two workpieces at the facing surfaces 225, 226, respectively, thereof. Prior to initiating the diffusion welding process, a layer of said particles 99 according to the invention may be applied to one or both surfaces 225, 226. Alternatively, the second workpiece may be immovably clamped and the first workpiece is pressed via the press. Alternatively, both the first workpiece and the second workpiece may be pressed together by opposed presses.

Without being bound to theory, the pressure induced force between the workpieces 221, 222 may cause at least part of the particles 99 to burn or form a plasma, which in turn assists in the solid state welding between the surfaces 225, 226.

The process illustrated in FIG. 18 may also be used for providing a pressure gas weld or crimp, in a similar manner to that described for the diffusion welding, mutatis mutandis, the main difference being that the temperature and pressure that are applied is sufficient to produce a pressure gas weld or crimp, respectively, rather than a diffusion weld.

The process illustrated in FIG. 18 may also be used for providing a cold weld, in a similar manner to that described for the diffusion welding, mutatis mutandis, the main difference being that the temperature is maintained at room temperature, and the pressure that is applied is sufficient to produce a cold weld rather than a diffusion weld.

Figure 19:
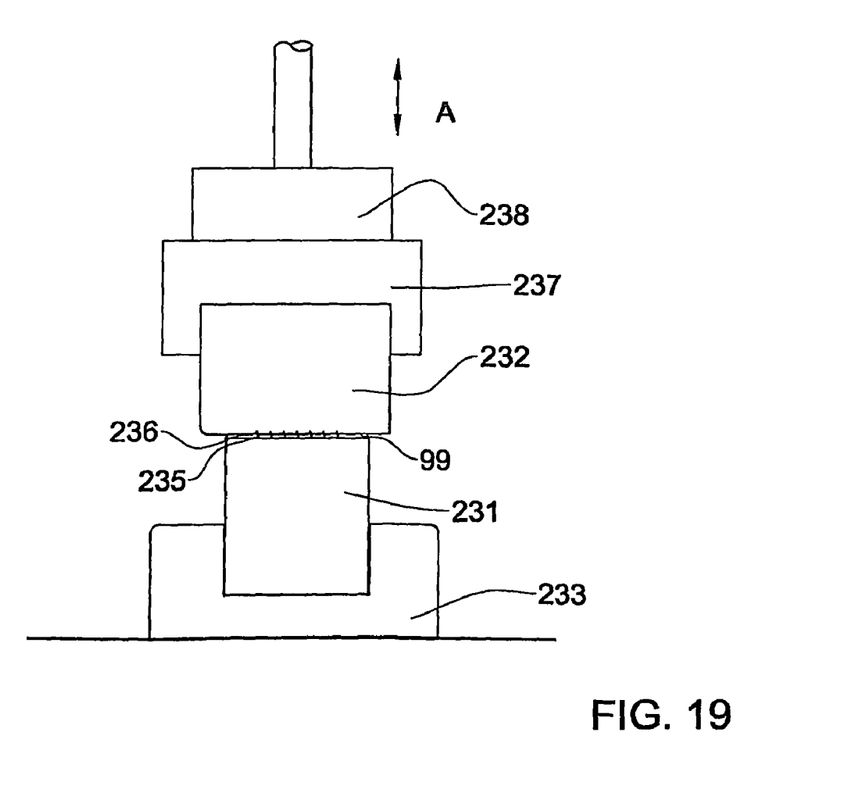
FIG. 19 schematically illustrates welding together workpieces according to yet other aspects of the invention.

Referring to FIG. 19, a welding process according to another aspect of the invention is illustrated, based on forge welding or crimping. A first workpiece 231 is held substantially stationary via clamp 233, and a second workpiece 232 is pressed against the first workpiece 231 and held on clamp 237. A layer of said particles 99 according to the invention may be applied to one or both surfaces 235, 236. An impact hammer 238 applies impact blows to the clamp 237 such as to provide a forge weld between the two workpieces at the facing surfaces 235, 236, respectively, thereof. Alternatively, the second workpiece may be immovably clamped and the hammer applied to the first workpiece. Alternatively, coordinated hammer blows may be applied in opposite directions to the first workpiece and the second workpiece.

Without being bound to theory, the impact force between the workpieces 231, 232 may cause at least part of the particles 99 to burn or form a plasma, which in turn assists in the solid state welding between the surfaces 235, 236.

According to yet another aspect of the invention, a foil or laminate may be used in place of a layer of said particles between facing surfaces of the first workpiece and the second workpiece prior to implementing the method of the invention, in a similar manner to that disclosed herewith using particles with reference to FIGS. 1 to 19, mutatis mutandis.

Such a foil may have a thickness ranging, for example, between about $1*10^{-6}$ m or $5*10^{-6}$ m to about $50*10^{-6}$ m or about $200*10^{-6}$ m, or greater, and may be made from any suitable metal or alloy, for example taken from any one of aluminium, zinc, magnesium, iron or steel, copper, magnesium, bismuth, lithium, nickel, silver, gold, titanium, tin.

According to yet another aspect of the invention, a foil or laminate together with particles may be used in place of a layer of said particles between facing surfaces of the first workpiece and the second workpiece prior to implementing the method of the invention, in a similar manner to that disclosed herewith using particles with reference to FIGS. 1 to 19, mutatis mutandis.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed example embodiments in accordance with the invention, it will be appreciated that many changes may be made therein without departing from the spirit of the invention.

The invention claimed is:

1. A method for forming a metallurgical bond between a first metal workpiece and one or more second metal workpieces, comprising:
   (a) bringing said first metal workpiece and said one or more second metal workpieces into proximity to one another such that a first portion of said first workpiece is in general overlying relationship with a second portion of said one or more second workpieces;
   (b) providing suitable material between said first portion and said second portion, said material being in the form of particles or foil; and
   (c) forcing at least a first part of said first workpiece comprising said first portion toward said a part of said one or more second workpiece comprising said second portion by means of any one of a suitable high pressure joining process and a high speed joining process, wherein a magnetic pulse generates a contact front at a velocity sufficient to form a plasma such as to cause the said first metal workpiece and said one or more second metal workpieces to become joined or welded to one another to form a metallurgical bond therebetween.

2. Method according to claim 1, wherein said any one of a suitable high pressure joining process and a high speed joining process comprises forcing said first portion and said second portion into a metallurgical bond-forming mutual contact in a manner such as to induce a contact front between said first portion and said second portion with said material therebetween, said contact front defining a locus between at least one metallurgically-bonded portion, wherein facing parts of said first portion and said second portion have been joined by said process, and at least one unbonded portion, wherein facing parts of said first portion and said second portion are to be joined by said process, wherein said contact front rapidly propagates between said first portion and said second portion.

3. Method according to claim 2, wherein at said contact front, said first portion and said second portion meet at said contact front at a predetermined acute angle.

4. Method according to claim 2, wherein said contact front propagates at a velocity above about $3*10^3$ m/second.

5. A method according to claim 2, wherein said contact front propagates at a velocity sufficient to form a plasma between said facing parts of said first portion and said second portion in said unbonded portion.

6. A method according to claim 5, wherein said plasma comprises at least portions of said material that are heated to plasma form by virtue of said propagating contact front.

7. Method according to claim 1, wherein in step (c) said PMF process comprises inducing a pulse magnetic force by passing an electric current pulse through a coil, the force being such as to cause said first part to impact onto said second part with an initial kinetic energy of the first workpiece prior to impact which is equal to or larger than the combined plastic deformation energy of the first workpiece and the elastic deformation energy of the second workpiece after impact, whereby said one or more second metal workpieces to become joined or welded to one another.

8. Method according to claim 1, wherein in step (b) said particles are applied to at least one of said first portion and said second portion.

9. Method according to claim 8, wherein step (b) is performed prior to step (a).

10. Method according to claim 8, wherein said particles are applied to at least one of a first surface of said first portion and a second surface of said second portion.

11. Method according to claim 10, wherein said particles are applied to at least one of a first surface and said second surface by spraying or coating said to at least one of a first surface said second surface with an emulsion comprising said metallic powder.

12. Method according to claim 11, wherein said emulsion comprises particles suspended in a suitable gas or liquid.

13. Method according to claim 10, wherein said particles are applied to at least one of said first surface and said second surface by inducing static electrical attraction forces between at least one of a first surface said second surface and said particles.

14. Method according to claim 10, wherein said particles are metallic and are magnetized and at least one of said first portion and said second portion is magnetisable and suitable current is passed therethrough to magnetise the same in proximity to said metallic powder, causing the powder to be magnetically attracted to at least one of said first portion and said second portion.

15. Method according to claim 1, wherein at least one of said first portion and said second portion comprises surface features configured for retaining said particles at least prior to step (c).

16. Method according to claim 15, wherein said surface features includes any one of depressions, dimples, channels and the like.

17. Method according to claim 1, wherein at least some of said particles are made from a metal in common with that of at least one of said first portion and said second portion.

18. Method according to claim 1, wherein at least some of said particles are made from a metal in common with that of said first portion and said second portion.

19. Method according to claim 1, wherein said particles comprise one or more metals which are different from one or more metals constituting said first portion and said second portion.

20. Method according to claim 1, wherein said particles have an effective diameter or characteristic dimension in the range of about $1*10^{-6}$ m and about $200*10^{-6}$ m.

21. Method according to claim 1, wherein said particles have an effective diameter or characteristic dimension in the range of about $5*10^{-6}$ m and about $50*10^{-6}$ m.

22. Method according to claim 1, wherein said particles have an effective diameter or characteristic dimension in the order of about $10^{-9}$ meters.

23. Method according to claim 1, wherein said particles comprise at least one metal or alloy selected from the group consisting of aluminium, iron or steel, copper, magnesium, bismuth, lithium, nickel, zinc, magnesium, silver, gold, titanium, tin.

24. Method according to claim 1, wherein said particles comprise at least one ceramic selected from the group consisting of magnesium oxide, aluminium oxide.

25. Method according to claim 1, wherein foil comprises a metallic foil of thickness between about $1*10^{-6}$ m and about $200*10^{-6}$ m.

26. Method according to claim 1, wherein said foil comprises a metallic foil of thickness between about $5*10^{-6}$ m to about $50*10^{-6}$ m.

* * * * *